United States Patent
Zhang et al.

(10) Patent No.: US 9,793,804 B2
(45) Date of Patent: Oct. 17, 2017

(54) CIRCUITS AND METHODS FOR CONTROLLING A THREE-LEVEL BUCK CONVERTER

(71) Applicant: QUALCOMM Incorporated, San Diego, CA (US)

(72) Inventors: Chuang Zhang, San Diego, CA (US); James Thomas Doyle, Carlsbad, CA (US); Farsheed Mahmoudi, San Diego, CA (US); Amirali Shayan Arani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/630,362

(22) Filed: Feb. 24, 2015

(65) Prior Publication Data

US 2016/0118887 A1    Apr. 28, 2016

Related U.S. Application Data

(60) Provisional application No. 62/067,883, filed on Oct. 23, 2014.

(51) Int. Cl.
*H02M 3/158*  (2006.01)
*H02M 1/12*   (2006.01)
(Continued)

(52) U.S. Cl.
CPC ............ *H02M 3/158* (2013.01); *H02M 1/126* (2013.01); *H02M 3/07* (2013.01); *H02M 7/483* (2013.01); *H02M 2003/072* (2013.01)

(58) Field of Classification Search
CPC ........... H02M 2003/072; H02M 7/483; H02M 1/126; H02M 3/07
See application file for complete search history.

(56) References Cited

U.S. PATENT DOCUMENTS 5,574,392 A    11/1996  Jordan
7,453,250 B2   11/2008  Qiu et al.
(Continued)

FOREIGN PATENT DOCUMENTS

CN    101860206 A    10/2010
CN    202940728 U     5/2013
(Continued)

OTHER PUBLICATIONS

Kim, W., et al., "A Fully-Integrated 3-Level DC-DC Converter for Nanosecond-Scale DVFS", IEEE Journal of Solid-State Circuits, vol. 47, No. 1, Jan. 2012, pp. 206-219.
(Continued)

*Primary Examiner* — Jue Zhang
*Assistant Examiner* — Lakaisha Jackson
(74) *Attorney, Agent, or Firm* — Haynes and Boone, LLP

(57) ABSTRACT

A circuit including: a control system for a three-level buck converter, the three-level buck converter including multiple input switches, each of the input switches receiving one of a plurality of different pulse width modulated signals, the control system including: a first clock signal and a second clock signal, the second clock signal being a phase-shifted version of the first clock signal; ramp generating circuitry receiving the first and second clock signals and producing first and second ramp signals, respectively, from the first and second clock signals; a first comparing circuit receiving the first ramp signal and producing a first one of the pulse width modulated signals therefrom; and a second comparing circuit receiving the second ramp signal and producing a second one of the pulse width modulated signals therefrom.

26 Claims, 14 Drawing Sheets

(51) Int. Cl.
*H02M 3/07* (2006.01)
*H02M 7/483* (2007.01)

(56) References Cited

U.S. PATENT DOCUMENTS

| | | |
|---|---|---|
| 7,612,603 B1 | 11/2009 | Petricek et al. |
| 7,692,938 B2 | 4/2010 | Petter |
| 7,696,735 B2 | 4/2010 | Oraw et al. |
| 8,212,537 B2 | 7/2012 | Carpenter et al. |
| 8,400,132 B2 | 3/2013 | Zambetti et al. |
| 9,300,210 B1 | 3/2016 | Lidsky et al. |
| 2007/0296383 A1* | 12/2007 | Xu .......................... H02M 1/14 323/282 |
| 2009/0174383 A1 | 7/2009 | Tsui et al. |
| 2011/0133704 A1* | 6/2011 | Zambetti ............. H02M 3/1584 323/212 |
| 2012/0146608 A1* | 6/2012 | Wan ..................... H02M 3/156 323/284 |
| 2013/0002227 A1 | 1/2013 | Ikeda et al. |
| 2014/0063884 A1 | 3/2014 | Itoh et al. |
| 2014/0111179 A1 | 4/2014 | Couleur et al. |
| 2014/0266135 A1 | 9/2014 | Zhak et al. |
| 2014/0268967 A1 | 9/2014 | White et al. |
| 2015/0009734 A1 | 1/2015 | Stahl et al. |
| 2015/0303815 A1 | 10/2015 | Chen et al. |
| 2016/0094123 A1* | 3/2016 | Chellappa ............. H02M 3/158 363/60 |
| 2016/0118886 A1 | 4/2016 | Zhang et al. |
| 2016/0190921 A1 | 6/2016 | Kumar et al. |
| 2016/0380543 A1 | 12/2016 | Zhang et al. |

FOREIGN PATENT DOCUMENTS

| | | | |
|---|---|---|---|
| CN | 102332818 B | 8/2013 | |
| CN | 103490794 A | 1/2014 | |
| CN | 103746557 A | 4/2014 | |
| EP | 2654205 A1 | 10/2013 | |
| IT | EP 1826893 A1 * | 8/2007 | .......... H02M 3/1584 |
| WO | WO-2012074967 A1 | 6/2012 | |

OTHER PUBLICATIONS

Yousefzadeh V., et al., "Three-Level Buck Converter for Envelope Tracking in RF Power Amplifiers", IEEE Applied Power Electronics Conference and Exposition 2005 (APEC 2005), vol. 3, Mar. 6-10, 2005, pp. 1588-1594.

International Search Report and Written Opinion—PCT/US2015/052025—ISA/EPO—Apr. 8, 2016.

Reusch D., "Three Level Buck Converter With Control and Soft Startup", IEEE Energy Conversion Congress and Exposition, Sep. 20, 2009, XP031887744, pp. 31-35. DOI: 10.1109/ECCE.2009.5316265, ISBN: 978-1-4244-2893-9.

Burton E.A., et al., "FIVR—Fully Integrated Voltage Regulators on 4th Generation Intel® Core™ SoCs," IEEE 29th Annual Applied Power Electronics Conference and Exposition (APEC), Mar. 16-20, 2014, pp. 432-439.

* cited by examiner

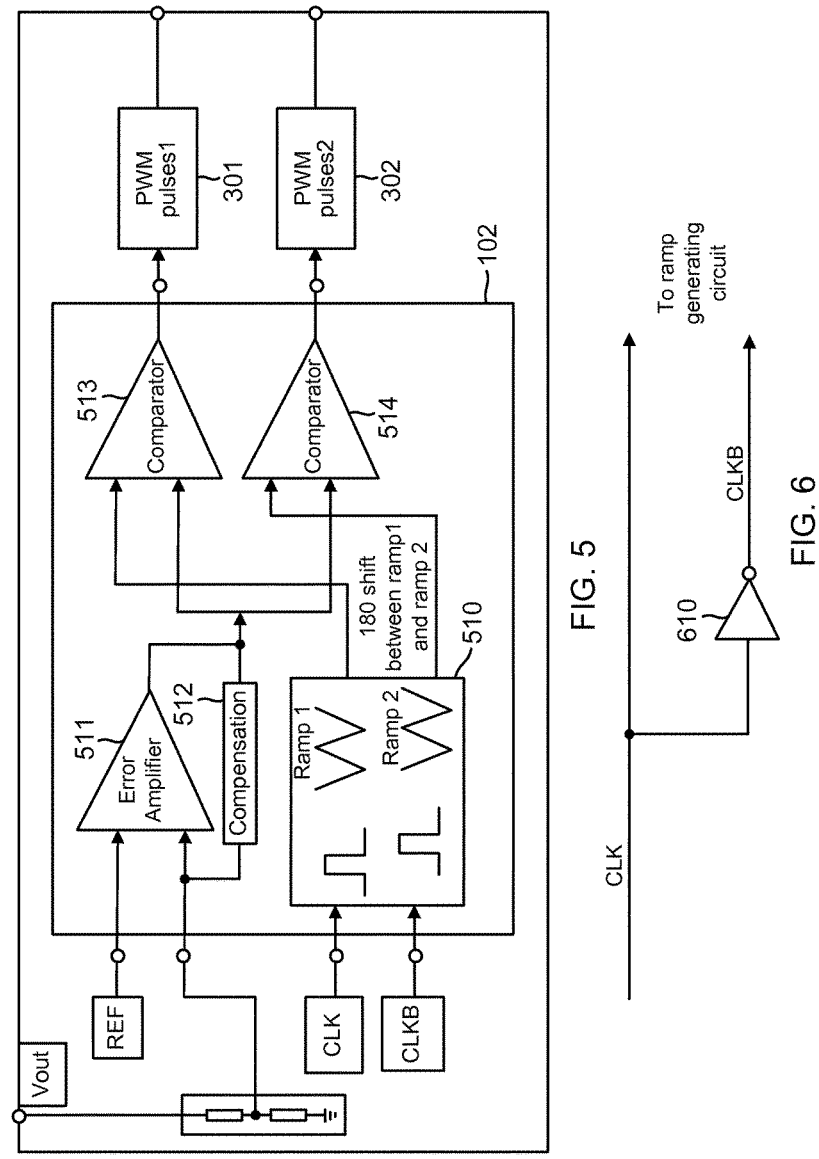

US 9,793,804 B2

CIRCUITS AND METHODS FOR CONTROLLING A THREE-LEVEL BUCK CONVERTER

CROSS-REFERENCE TO RELATED APPLICATIONS

The present application claims the benefit of U.S. Provisional Patent Application No. 62/067,883, filed Oct. 23, 2014, and entitled "Circuits and Methods Providing Three-Level Signals At a Synchronous Buck Converter," the disclosure of which is incorporated by reference herein in its entirety.

TECHNICAL FIELD

This application relates to voltage converters and, more specifically, to three-level buck converters.

BACKGROUND

There are a wide variety of voltage converters available today, one type being the buck converter. Generally, a buck converter receives an input voltage and provides a stepped-down output voltage with a stepped-up output current. In other words, buck converters may typically be used in applications where it is desired to decrease a Direct Current (DC) voltage. Example applications include processing cores, where a buck converter is used to step down a DC voltage from a voltage rail so that the output voltage of the buck converter corresponds to an appropriate input voltage of the processing core.

An example conventional buck converter includes multiple switches at an input of the buck converter. The switches are turned on and off by a pulse width modulated input signal, where the duty cycle of the pulses determines an output voltage of the buck converter. As the switches turn on and off, they modulate a DC input voltage (sometimes referred to as VDD) and provide that modulated voltage to an inductor. The inductor is in communication with a capacitor, and the time-varying nature of the voltage at the input of the inductor causes the inductor to create a time-varying current. The interaction of the inductor and capacitor with the time-varying voltage and current produces a substantially constant output voltage, which is at a lower DC level than VDD.

One variety of buck converter is a three-level buck converter. Conventional three-level buck converters enjoy an effective doubling of their switching frequency. In one example, a conventional three-level buck converter has four input switches that each receive one of two pulse width modulated input signals. The timing of the two pulse width modulated input signals and the arrangement of the switches provides for an input voltage at the inductor that is at twice a frequency of the pulse width modulated input signals. In this conventional example, the input voltage at the inductor may vary between zero and VDD/2 or between VDD/2 and VDD, depending on the duty cycle of the pulse width modulated signals.

Three-level buck converters may be advantageous in some applications because an effective doubling of the switching frequency may allow for use of a smaller inductor. However, conventional three-level buck converters may sometimes be used in conjunction with conventional pulse width modulation controllers that produce a pulse width modulated signal and then use a Delay Locked Loop (DLL) to produce a delayed version of the pulse width modulated signal. DLLs may be complicated and unnecessarily expensive to implement in silicon. Accordingly, there is a need for a simpler way to control for a three-level buck converter.

SUMMARY

Circuits and methods for providing stepped-down voltage are provided. In one example, a pulse width modulation controller receives the clock and a phase-shifted version of the clock and produces a first and a second ramp signal from those clock signals, respectively. In some embodiments, the phase-shifted version of the clock is simply an inverted version of the clock, so that an inverter circuit may be used on one branch of the clock. Comparators receive the ramp signals and an error signal and produce two pulse width modulated signals based on the relative voltage values of the ramp signals and the error signal. The circuit may further include a three-level buck converter that receives the two pulse width modulated signals and produces a controlled output voltage corresponding to a duty cycle of the pulse width modulated signals.

An example method embodiment includes receiving and/or producing a clock signal and a phase-shifted version of the clock signal and producing a first ramp signal and a second ramp signal in response thereto. In this example, ramp signal generating circuitry receives the two clocks, where one clock is used to produce the first ramp signal, and the phase-shifted clock is used to produce the second ramp signal, and the second ramp signal is accordingly phase-shifted with respect to the first ramp signal. The two ramp signals are then used to produce the two pulse width modulated signals. The method may further include generating an error signal in response to a fed back indication of the buck converter's output voltage. The error signal can then be used to produce the two pulse width modulated signals from the two ramp signals. In one example, a comparator receives the error signal and the ramp signal and produces one pulse width modulated signal based on the relative voltage levels of the error signal and the ramp signal. Another comparator receives the error signal and the other ramp signal and produces the other pulse width modulated signal using a similar technique.

Other embodiments may further include voltage converters having multiple three-level buck converters and multiple pulse width modulation controllers. In one example, a voltage converter has a first pulse width modulation controller controlling a first three-level buck converter and a second pulse width modulation controller controlling a second three-level buck converter. Each buck converter is controlled by two pulse width modulated signals that are spaced 180° apart. The pulse width modulated signals controlling the first buck converter are spaced 90° relative to the pulse width modulated signals controlling the second buck converter.

BRIEF DESCRIPTION OF THE DRAWINGS

FIG. 5 illustrates an example pulse width modulation controller for use with a three-level buck converter, according to one embodiment.

FIG. 6 illustrates an example circuit for producing a clock and a phase-shifted version of that clock, according to one embodiment.

DETAILED DESCRIPTION

Example Circuit Embodiments

Figure 1:
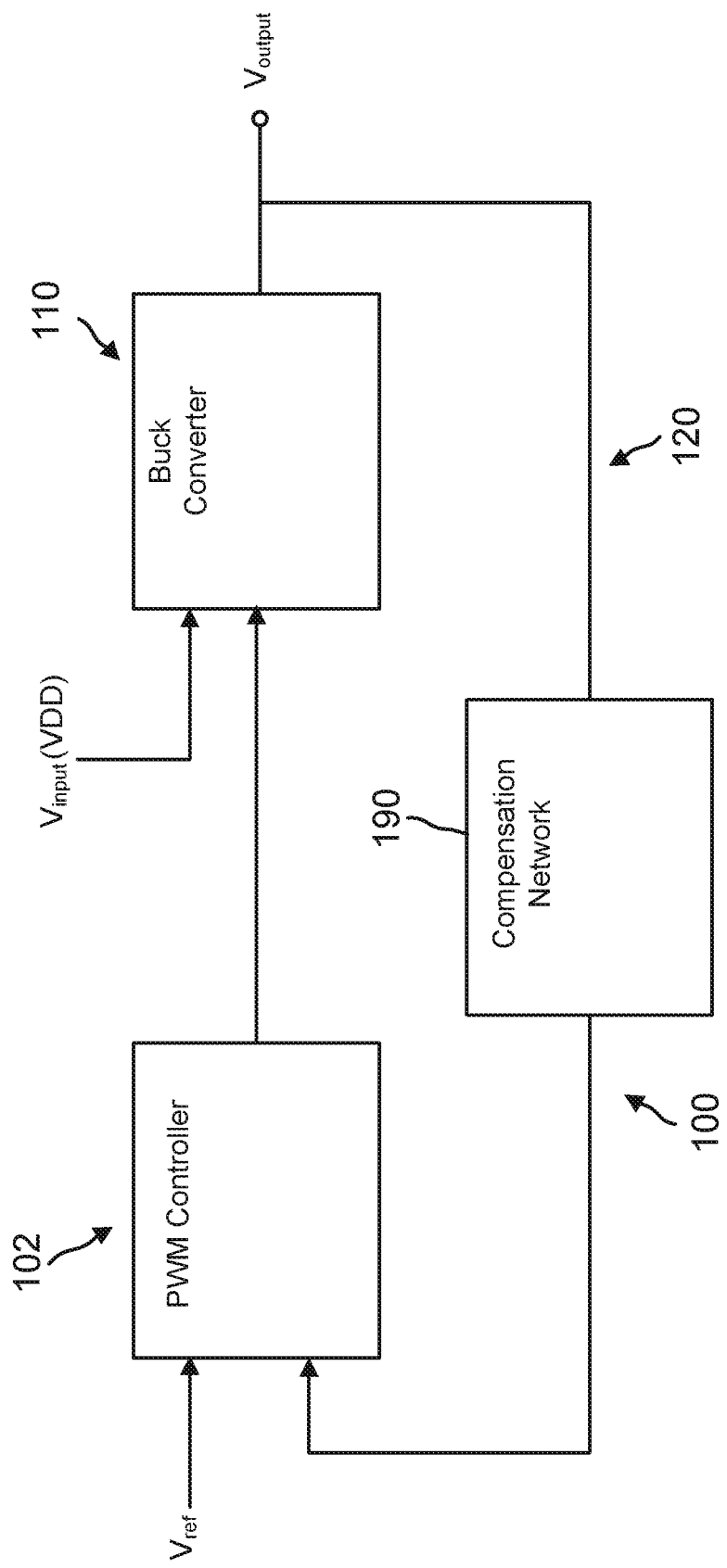
FIG. 1 illustrates an example feedback loop having a voltage converter, where the feedback loop maintains the output voltage at a relatively constant level, in accordance with an embodiment of the disclosure.

FIG. 1 is an architectural diagram illustrating an example feedback loop for providing a constant, or nearly constant, Voutput. Pulse Width Modulation (PWM) controller 102 receives a reference voltage (Vref) and a feedback signal 120 providing a value of Voutput and outputs a PWM signal in response to a difference between Vref and Voutput. The PWM controller 102 modulates the PWM signal by adjusting the duty cycle of the PWM signal. In general, a larger duty cycle of the PWM signal increases a voltage at the output of synchronous buck converter 110, and a smaller duty cycle of the PWM signal decreases a voltage at the output of synchronous buck converter 110. In this way, PWM controller 102 continually adjusts the duty cycle of the PWM signal to keep Voutput nearly constant. In this example embodiment, the PWM signal is actually two PWM signals, as shown in more detail in FIG. 3.

Buck converter 110 receives Vinput, which in some embodiments is a power signal from a power rail on a semiconductor die. In other embodiments, Vinput may include power from a battery or other voltage source. Switches in buck converter 110 open and close according to the control signals from PWM controller 102. The buck converter 110 provides a steady output voltage at Voutput. Synchronous buck converter 110 may include any synchronous buck converter now known or later developed that provides a three-level signal to the inductor. An example three-level signal may include, for instance, a signal that varies between zero and VDD/2 or between VDD/2 and VDD, depending on PWM timing and duty cycle.

In some examples, the buck converter 110 is a third-order system from a control system standpoint, so that it has either two zeros and one pole or two zeros and two poles. As third-order systems may be unstable in some embodiments, the example of FIG. 1 includes compensation network 190. Compensation network 190 is placed in series with the feedback signal 120 to cancel out poles and zeros, thereby causing the feedback loop of FIG. 1 to be a first order control system having a single pole and no zeros. Compensation network 190 may also be referred to as a "type-3 compensator." Of course, various embodiments may use any appropriate control system, which may be the same as or different from compensation network 190.

Figure 2:
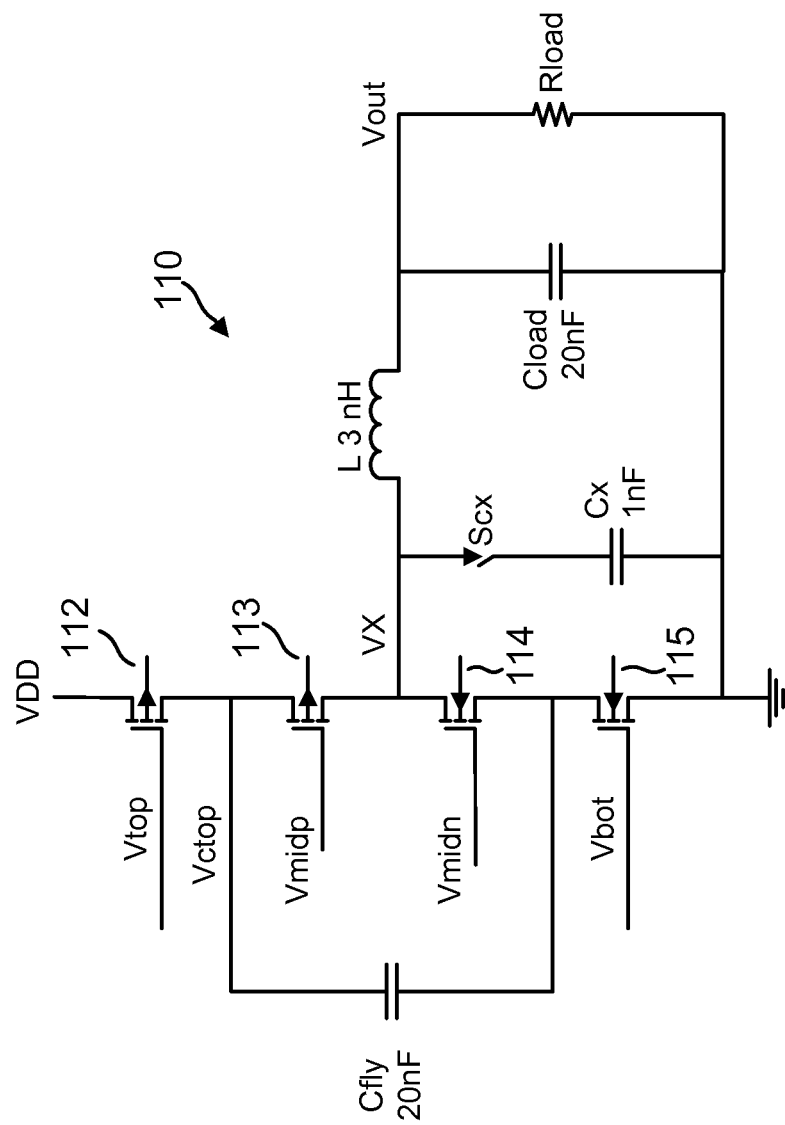
FIG. 2 illustrates an example three-level buck converter in accordance with an embodiment of the disclosure.

FIG. 2 is an illustration of an exemplary synchronous buck converter that can be used as buck converter 110 in the embodiment of FIG. 1. In FIG. 2, Vinput is shown as VDD, Voutput is shown Vout, and a resistive load Rload is shown between Vout and ground. In system on chip (SOC) embodiments, Rload may include, for example, a processing core, a modem, or the like. However, the scope of embodiments is not limited to SOCs.

FIG. 2 illustrates four switches, 112, 113, 114, 115 that are the input switches for buck converter 110. Flying capacitor (Cfly) is coupled between switches 112 and 113 and also between switches 114 and 115. In this example, the flying capacitor Cfly has a value of 20 nF, and the load capacitor (Cload) also has a value of 20 nF. In other words, the flying capacitor Cfly and the load capacitor Cload have a same value. At 1 nF, the switched capacitor (CX) is much smaller that both Cfly and Cload. Of course, the values provided in FIG. 2 are exemplary only, as other embodiments may use other values to achieve the same or similar results. In some embodiments, capacitors Cfly and Cload are larger than capacitor CX by at least an order of magnitude when measured in Farads. The principles discussed herein can be applied to a variety of different configurations of a three-level buck converter using any appropriate values for capacitors, inductors, resistors, switches, and the like.

In some embodiments, the flying capacitor Cfly may be manufactured as a metal-insulator-metal (MIM) capacitor to reduce parasitic to ground losses. However, the capacitor Cfly may be made according to any appropriate manufacturing process in various embodiments.

The input switches 112-115 provide a voltage (VX) at the input node of the inductor L, and voltage VX is a three-level voltage signal. As explained in more detail below, PWM signals applied to the input switches 112-115 have half the frequency of the voltage changes of VX. In other words, the use of a three-level buck converter provides for a doubling of the frequency of the voltage at the buck converter's inductor. An advantage of a higher frequency at the voltage of the inductor L is that the value of the inductor L can be reduced. For instance, a doubling of the frequency of VX allows the size of the inductor L to be reduced to one quarter. Generally, a reduction in a value of an inductor allows for a physically smaller inductor, which can lead to lower costs and ease of manufacturing in some cases.

Switched capacitor CX is placed between the input node of the inductor L and ground to reduce ripple at that node. In operation, capacitor CX charges and discharges as the value of VX changes, and its charging and discharging has the effect of neutralizing ripple at the input node of the inductor L. It is counterintuitive to place capacitor CX in its illustrated position between inductor L and ground because capacitor CX would be expected to cause some loss in the circuit by conducting a small current to ground during some points in its operation. However, capacitor CX is appropriately sized very small compared to both the flying capacitor and the load capacitor (Cfly and Cload) so that any current that is conducted is very small. Also, the amount of energy stored by capacitor CX may be the same as or less than energy of the ripples at VX, so that the energy at capacitor CX may typically be used to neutralize ripple rather than conduct substantial current to ground.

In general, ripple is a phenomenon that is experienced with loads that are relatively heavy but is largely absent with loads that are relatively light. In some embodiments, capacitor CX is switched into the circuit by closing switch SCX when the load is relatively heavy. In those embodiments, the switch SCX may be opened when the load is relatively light, thereby removing capacitor CX from the circuit. In one example embodiment, the PWM controller (circuit 102 of FIG. 1) determines that the load is increasing by sensing a voltage droop and determines that the load is decreasing by sensing a voltage increase, and the PWM controller can turn switch SCX on or off as appropriate.

Figure 3:
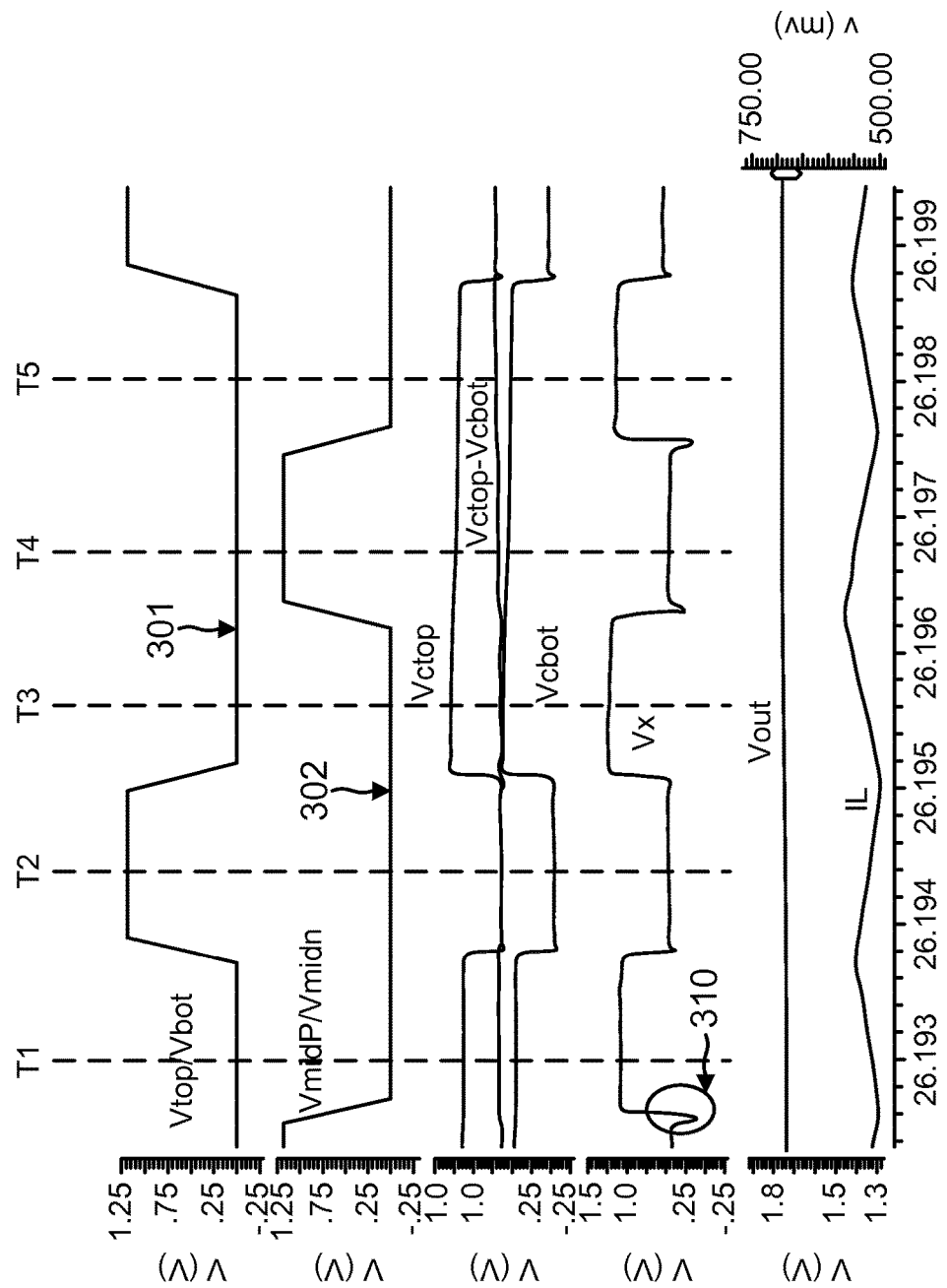
FIG. 3 illustrates an example timing diagram of the signals associated with the three-level buck converter of FIG. 2 in accordance with an embodiment of the disclosure.

FIG. 3 is an illustration of an example timing diagram, according to one embodiment. In this example, voltages 301 and 302 are PWM signals that are produced by circuit 102 of FIG. 1. Voltage 301 is provided to switch 112 and switch 115. Voltage 302 is provided to switches 113 and 114. VX and Vout are also labeled in FIG. 3. Of note in FIG. 3 is that voltage VX is at twice a frequency of voltages 301 and 302. In this example, voltages 301 and 302 are at 250 MHz, whereas the voltage VX is at a frequency of 500 MHz. However, the scope of embodiments is not limited to any particular frequency of input clock signals, as any appropriate frequency may be used in other embodiments. It is also noted that the timing diagram of FIG. 3 shows that each of the four switches 112-115 of FIG. 2 is actively controlled during normal operation (where operation is described more fully below with respect to time periods T1-T5).

As noted above, three-level buck converter 110 is operable to provide voltage VX as a three-level voltage that can vary either between zero and VDD/2 or between VDD/2 and VDD. In the example of FIG. 3 voltage VX varies between VDD/2 and VDD as a result of the duty cycle of signals 301 and 302. However, it is understood that voltage VX would vary between zero and VDD/2 if the duty cycle of signals 301 and 302 was reduced.

Further, various embodiments provide for an elimination or reduction of ripple at the voltage VX. Example ripple 310 is illustrated in FIG. 3 around time T1, and similar ripple occurs at voltage VX at other times as well. As noted above, the use of switched capacitor CX may reduce or eliminate ripple, and in this embodiment the amount of ripple is not non-zero, but is reduced from what it would be otherwise in the absence of capacitor CX in the circuit of FIG. 2.

FIG. 3 further has time markings to indicate times T1-T5 for ease of explanation. At time T1 switch 112 is ON, switch 113 is ON, switch 114 is closed, and switch 115 is closed. Since switches 112 and 113 are ON, VX is brought to VDD, and Cfly is charged.

At time T2 switch 112 is OFF, switch 113 is ON, switch 114 is OFF, and switch 115 is ON. Thus, capacitor Cfly is coupled across the input node to inductor L and ground through switch 115. The voltage VX is accordingly decreased.

At time T3, switch 112 is ON, switch 113 is ON, switch 114 is OFF, and switch 115 is OFF. Capacitor Cfly is charged again, similar to that described above with respect to time T1. Voltage VX is increased.

Figure 4:
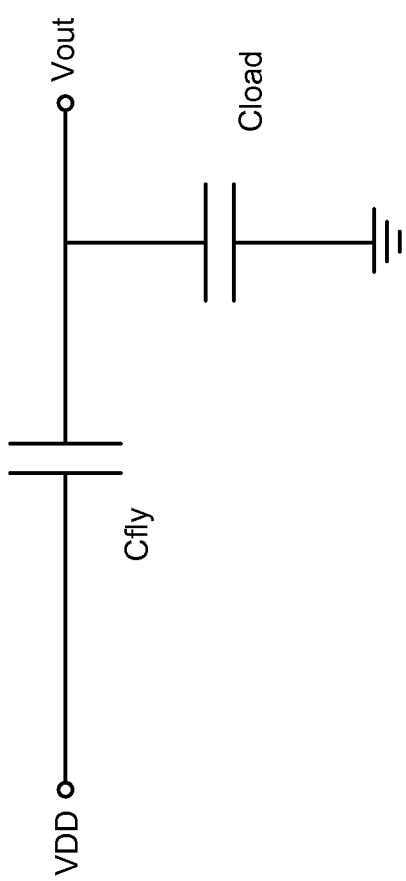
FIG. 4 illustrates an example voltage divider scenario during operation of the three-level buck converter of FIG. 2, according to an embodiment of the disclosure.

At time T4, switch 112 is ON, switch 113 is OFF, switch 114 is ON, and switch 115 is OFF. Thus, capacitor Cfly is coupled between VDD through switch 112 and VX through switch 114. Capacitors Cfly and Cload acts as a voltage divider at time T4, as illustrated in FIG. 4.

At time T5, switch 112 is ON, switch 113 is ON, switch 114 is OFF, and switch 115 is OFF. Capacitor Cfly is charged again by virtue of VDD. The progression of times from T1 through T5 shows how switches 112-115 are operated to charge and discharge capacitor Cfly and to provide the voltage VX at the input node of inductor L.

Of course, the timing diagram of FIG. 3 represents a snapshot of time, and it is understood that in a real-world example a three-level buck converter may operate for an extended period of time including thousands or millions of cycles of PWM signals 301 and 302. Referring back to the feedback loop of FIG. 1, the PWM controller 102 compares Vout to Vref and adjusts the duty cycle of PWM signals 301 and 302 to keep the level of Vout substantially constant. While the timing diagram of FIG. 3 does not show the duty cycle of PWM signals 301 and 302 being adjusted, it is understood that the feedback loop provides such functionality.

The present embodiment provides for a single control law. For instance, whether Vout is above or below one-half VDD, the timing of the signals 301 and 302 is the same (though the duty cycles may vary). Accordingly, the embodiment illustrated in FIGS. 2 and 3 does not alternate between control laws over its range of operation.

FIG. 5 is an illustration of an example configuration for PWM controller 102 of FIG. 1, according to one embodiment. As noted with respect to FIG. 1, the PWM controller 102 receives an output voltage (Vout) of the three-level buck converter and also receives a reference voltage (Ref) and produces an error signal in response thereto. The PWM controller 102 outputs the first and second PWM signals (PWM pulses 301 and PWM pulses 302 of FIG. 3) having a duty cycle that is either increased or decreased depending on the value of the error signal. The duty cycle of the first and second PWM signals 301 and 302 controls the output voltage of the three-level buck converter, thereby keeping the output voltage at a substantially constant level.

The PWM controller 102 includes a ramp generating circuit 510, which receives a first clock (CLK) and a second clock (CLKB), where the first clock and the second clock have the same frequency and amplitude but are phase-shifted from one another. In this example, CLKB is the second clock signal, and it is phase-shifted by 180° from CLK. One example technique to provide the first and second clocks is to apply an inverting circuit to clock CLK so that clock CLKB is an inverted version of clock CLK. The ramp generating circuit 510 receives the two clocks and produces signal Ramp 1 from clock CLK and Ramp 2 from clock CLKB. The signals Ramp 1 and Ramp 2 are accordingly phase-shifted by 180° from each other.

An example circuit configuration for producing clocks CLK and CLKB is shown in FIG. 6, according to one embodiment. In this example, clock CLK is inverted by inverter 610 so that the two outputs of the circuit of FIG. 6 include CLK and CLKB.

PWM controller 102 receives the reference signal Ref and the voltage output Vout and feeds the signals to error amplifier 511 and compensation circuit 512. Circuits 511 and 512 are configured to produce a filtered error signal. In this example, the output of error amplifier 511 is fed back through compensation circuit 512 to the feedback input of error amplifier 511. The result is an error signal that is an appropriate indicator of any deviation of Vout from the reference voltage Ref. For instance, if Voutput is slightly low, then the error signal produced by circuits 511 and 512 causes a corresponding increase in the duty cycle of PWM signals 301 and 302 to compensate for that deviation. Similarly, if Voutput a slightly high, then the error signal causes a corresponding decrease in the duty cycle of PWM signals 301 and 302.

Figure 7:
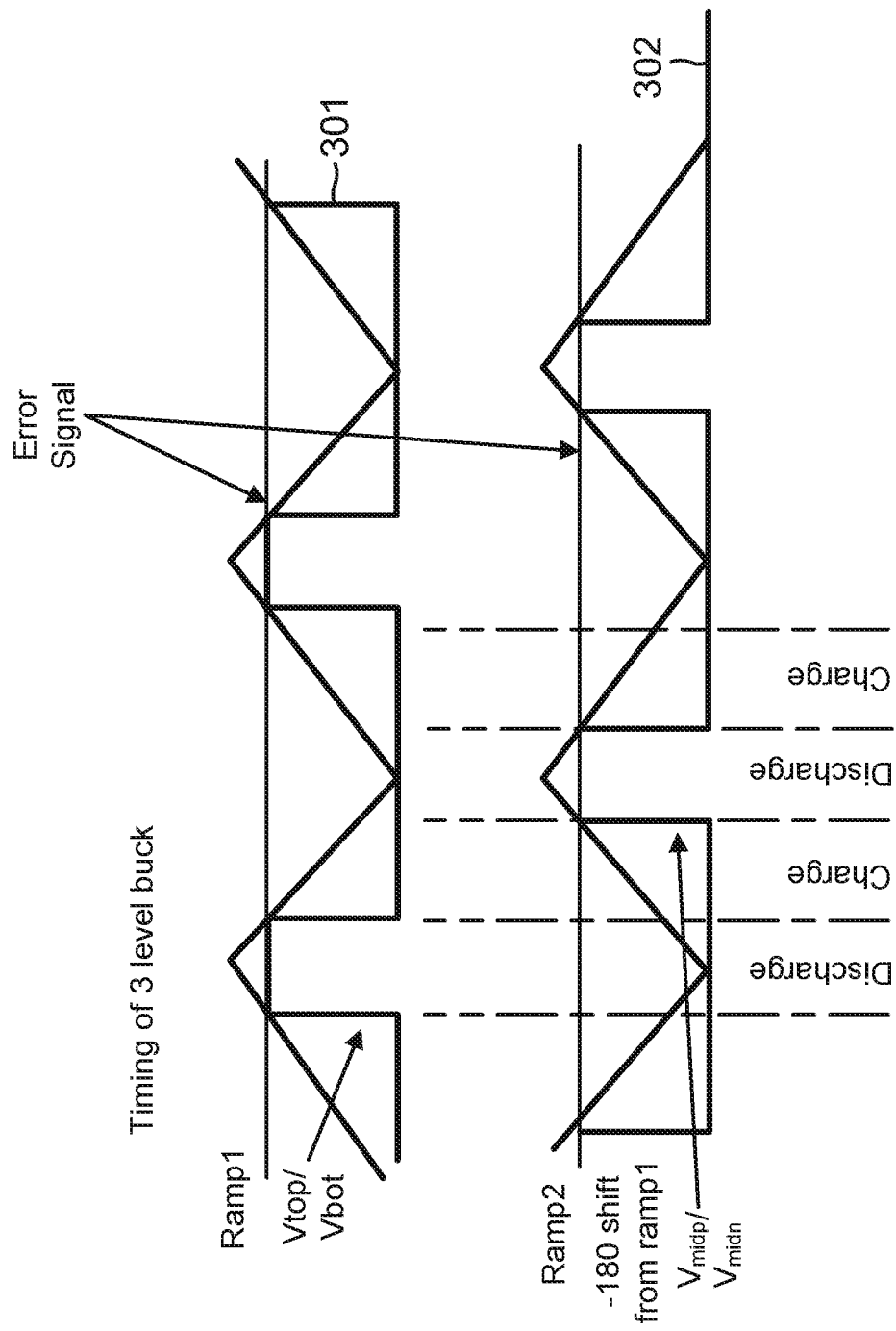
FIG. 7 illustrates an example timing diagram and waveform diagram depicting generating two pulse width modulated signals from respective ramp signals and an error signal, according to one embodiment.

The PWM controller 102 includes two comparators 513 and 514. The first comparator 513 receives the error signal and Ramp 1. The second comparator 514 receives the error signal and Ramp 2. The comparators 513, 514 produce the first and second PWM signals 301 and 302, as shown in FIG. 7. For instance, Ramp 1 is shown on top against the error signal, and the first comparator produces the first PWM signal 301 by outputting a high-voltage level when Ramp 1 is higher than the error signal and producing a low voltage level when Ramp 1 is lower than the error signal. The second PWM signal 302 is produced in a similar manner by the second comparator. In this example, signals 301 and 302 have a same duty cycle.

In the embodiment described above, since Ramp 1 and Ramp 2 both have up ramp portions and down ramp portions, PWM signals 301 and 302 are modulated on both their leading edges and their trailing edges. Thus, neither the leading edges nor the trailing edges of signals 301 and 302 are precisely synchronized to the clock. Other embodiments using only a falling edge ramp or a leading edge ramp (not a true sawtooth) typically do not modulate both edges of PWM signals. Additionally, the use of Ramp 1 and Ramp 2 provides a gain of two, in contrast to an embodiment using only a falling edge ramp or a leading edge ramp that would provide a gain of one.

An advantage of the embodiment described above with respect to FIG. 5 is that both PWM signals 301 and 302 may be produced from an input clock and an inverted input clock (CLK and CLKB), where inverting circuitry is relatively simple and inexpensive. The embodiments described above avoid the use of a delay lock loop (DLL) to produce a second PWM signal from a first PWM signal, which would generally be more complex and expensive than the solution described above.

Figure 8:
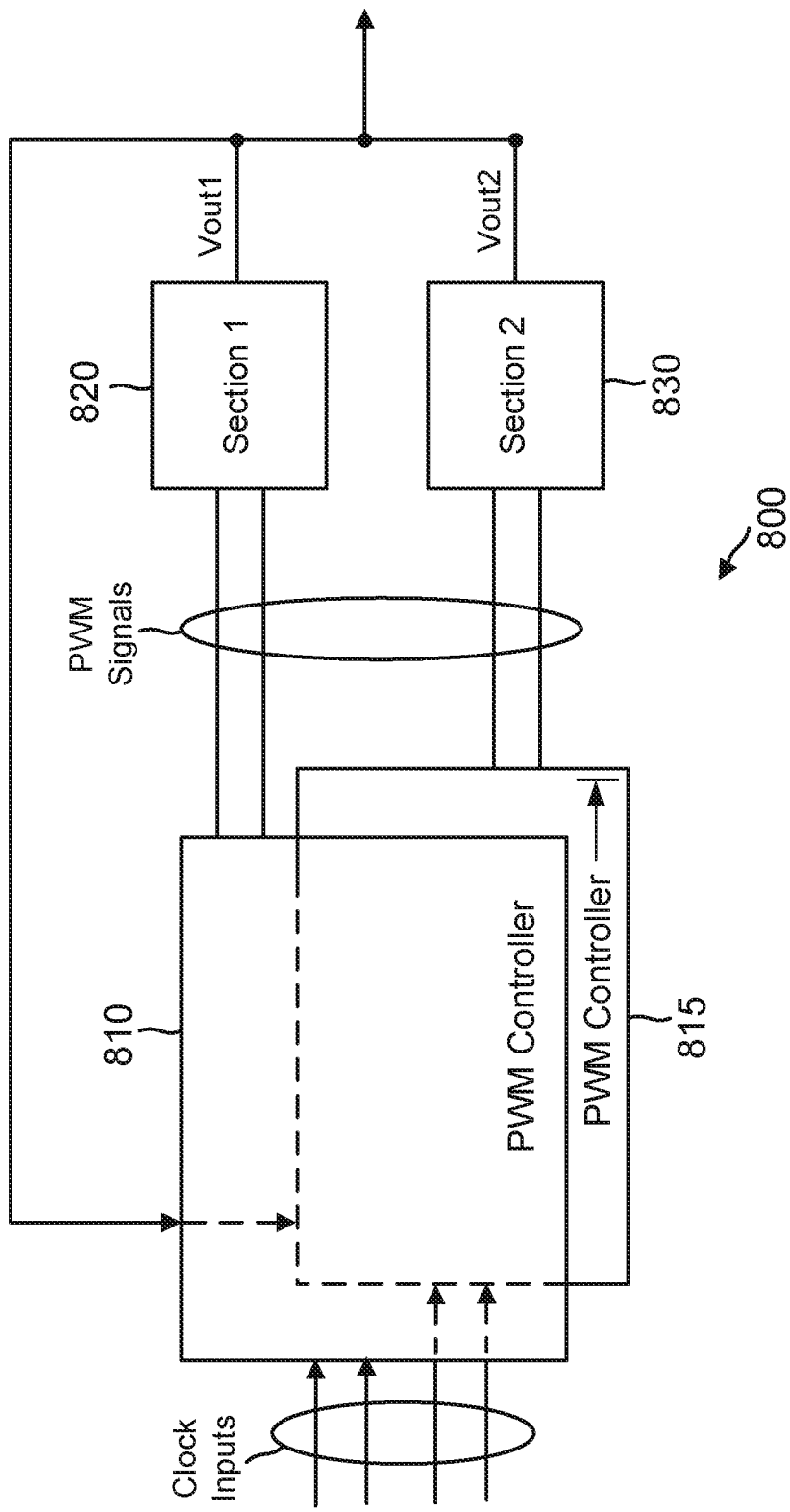
FIG. 8 illustrates an example two-section voltage converter that has two pulse width modulation controllers and two buck converters, according to one embodiment.

The scope of embodiments is not limited to two clocks that are phase-shifted from one another by 180°. FIG. 8 is an illustration of an example system 800 having two separate buck converters 820 and 830. In the example of FIG. 8 the first buck converter 820 is a three-level buck converter similar to converter 102, and it is labeled "section 1." The second buck converter 830 is also a three-level buck converter similar to converter 102, and it is labeled "section 2." Further in this example, both buck converters 820, 830 are controlled by respective PWM controllers 810 and 815, which may be substantially similar to PWM controller 102 of FIG. 5. It is understood that in other embodiments separate buck converters could be controlled by a common PWM controller.

Buck converters 820, 830 produce respective outputs of Vout1 and Vout2, and their output nodes are connected so that their output current is summed. Similarly to the system of FIG. 1, buck converters 820, 830 feed back their voltage outputs to PWM controllers 810 and 815 so that PWM controllers 810 and 815 may adjust a duty cycle of the PWM signals.

Further in this example, PWM controller 810 receives a first clock and a second clock phase-shifted from each other by 180°, and PWM controller 815 also receives a first clock and a second clock phase-shifted from each other by 180°. Additionally, though, the first and second clock signals of the second PWM controller 815 are shifted by 90° with respect to the clock signals of the first PWM controller 810.

Figure 9:
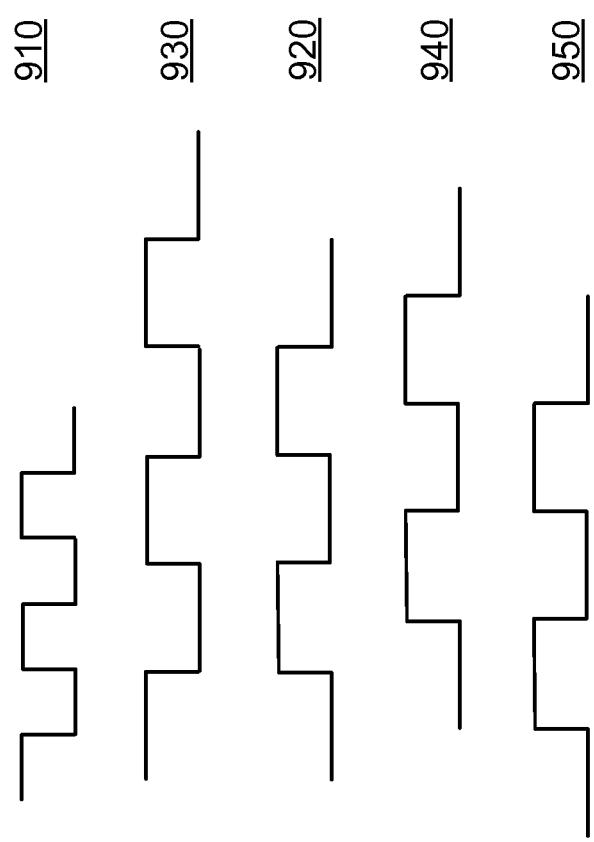
FIG. 9 illustrates an example waveform diagram of signals for use in the system of FIG. 8, according to one embodiment.

FIG. 9 includes illustrations of example clock signals for use in the system of FIG. 8, according to one embodiment.

Signal 910 is an input clock having twice a frequency of the clocks used to produce the ramp signals. Signal 910 is also referred to as a 2× clock. Signals 920 and 930 are clocks that can be sent to a ramp generating circuit, such as circuit 510 of FIG. 5, and signals 920 and 930 are phase-shifted relative to each other by 180°. In this example, signals 920 and 930 are sent to PWM controller 810. One example technique to produce signal 920 is to apply signal 910 to a positive edge triggered flip-flop. Signal 930 can then be produced by inverting signal 920.

Signals 940 and 950 are clocks that can be sent to another ramp generating circuit, such as circuit 510 of FIG. 5. In this example, signals 940 and 950 are sent to PWM controller 815. In one example, signal 940 may be produced by feeding signal 910 to a negative edge triggered flip-flop. That results in the 90° phase shift between signals 920 and 940. Signal 950 may then be produced by inverting signal 940.

In one example, signals 920 and 930 are clocks that are used to produce PWM signals corresponding to signals 301 and 302 of FIG. 3. Those PWM signals are then used to control the input switches of buck converter 820. Similarly, signals 940 and 950 are clocks that are used to produce PWM signals that are 90° phase-shifted from respective signals 301 and 302. Those PWM signals are then used to control the input switches of buck converter 830.

Figure 10:
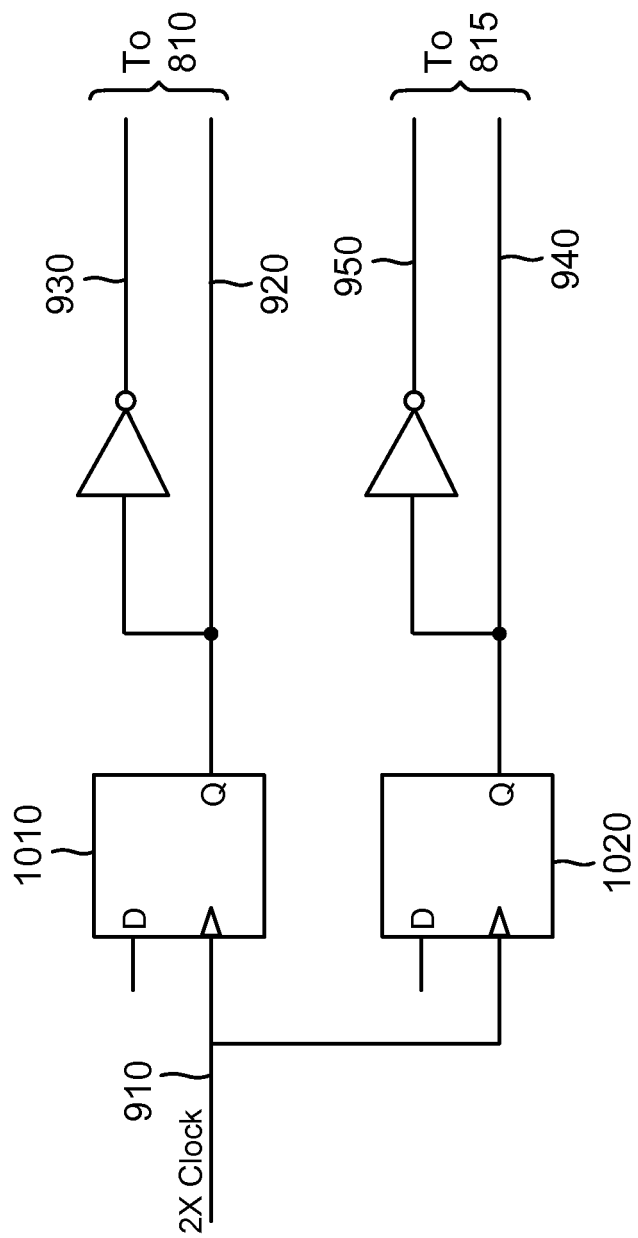
FIG. 10 illustrates an example circuit for producing four different clocks for use in the two different pulse width modulation controllers of FIG. 8, according to one embodiment.

In this way, controller 810 receives the clock 920 (Section 1 Phase A) and clock 930 (Section 1 Phase B), and controller 815 receives the clock 940 (Section 2 Phase A) and clock 950 (Section 2 Phase B). An example circuit for producing clocks 920-950 is shown in FIG. 10, according to one embodiment. Signal 910 is received at positive edge triggered flip-flop 1010 and negative edge triggered flip-flop 1020. The output of flip-flop 1010 is signal 920, and signal 930 is an inverted version of signal 920. The output of flip-flop 1020 is signal 940, and signal 950 is an inverted version of signal 940.

The embodiments of FIGS. 8-10 show two sections. However, the scope of embodiments may include any appropriate number of buck converters having their outputs added and with PWM controllers having their input clocks shifted relative to those of the other PWM controllers. Or, put another way, the embodiment shown in FIG. 8 may be scaled as appropriate to include any number of buck converters having their outputs added.

For example, another embodiment (not shown) may include four sections. In such an embodiment, each section receives two clocks that are phase-shifted from each other by 180°, and further, the clock signals are spread out by 45° section-by-section. The clock signals of one section are phase-shifted relative to the clock signals of another section in order to provide less ripple at Vout. Specifically, the output voltage Vout appears to be substantially steady, although there may be slight sinusoidal variations produced by the control system and corresponding to the phases of the clocks. If each section receives the same clocks, then the sinusoidal variations of each section may cause a larger ripple, whereas if the sections are phase-shifted from each other, the ripples may be smoothed out over 360° of the clock cycle. Similarly, an embodiment having eight sections (not shown) would spread the clock signals out by 22.5° section-by-section, and embodiments with larger numbers of sections would spread their clocks out section-by-section according to that pattern.

Embodiments having multiple sections may be used to provide increased current at the output voltage Vout. For example, in some embodiments each section may produce around one Ampere of current, whereas a microprocessor powered by the buck converter may use up to three or four Amperes. Accordingly, multiple sections may be combined so that the current is summed to the desired output level.

Example Method Embodiments

Figure 11:
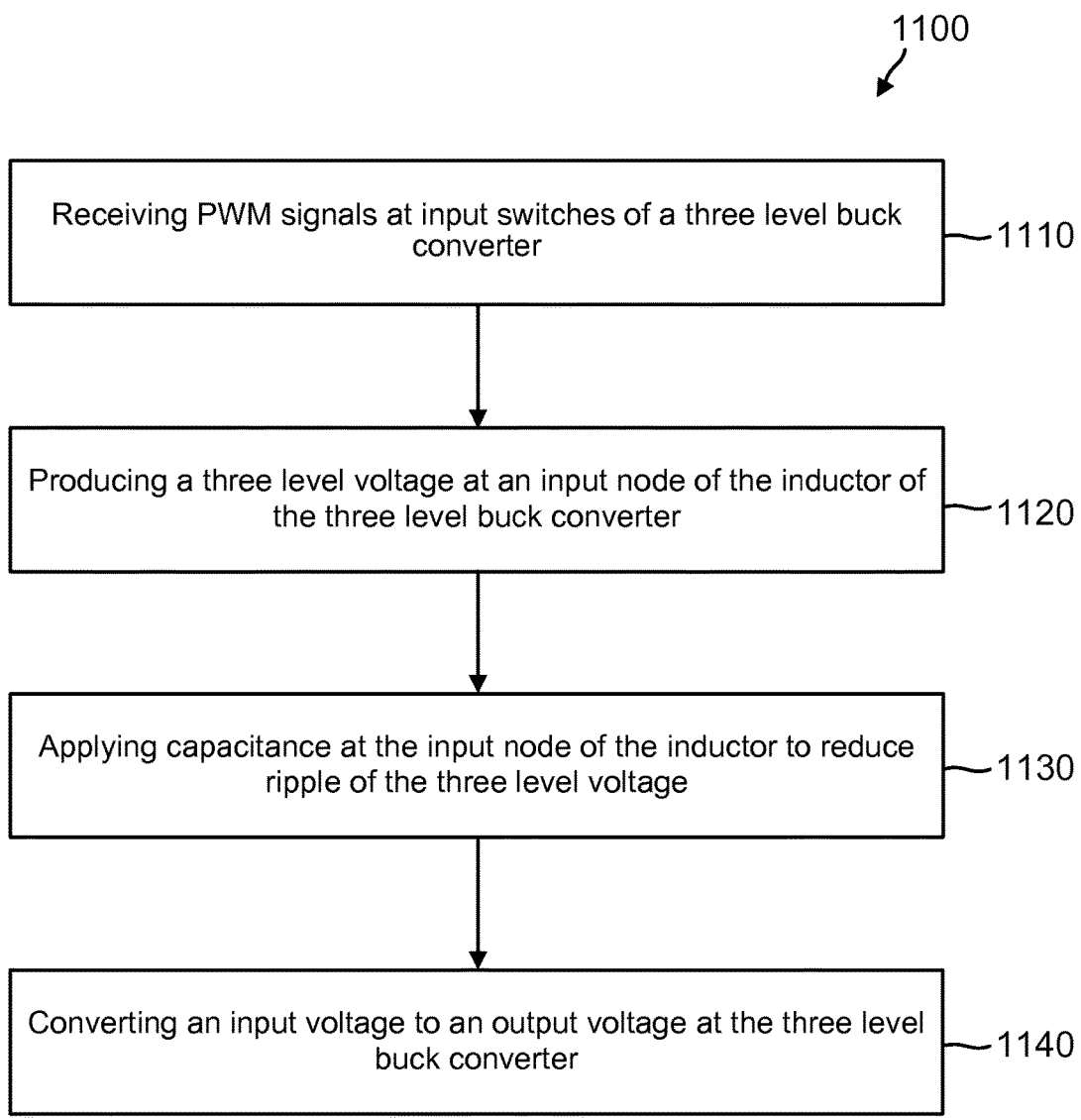
FIG. 11 illustrates a flowchart of an example method of use for the system of FIGS. 1-4 to achieve a output voltage in accordance with an embodiment of the disclosure.

A flow diagram of an example method 1100 of operating a three-level buck converter is illustrated in FIG. 11. In one example, method 1100 is performed by a three-level buck converter, such as buck converter 110 of FIG. 2 or buck converters 810, 820 of FIG. 8, to convert an input voltage (for example VDD) to an output voltage Vout with minimal ripple at an input node of the inductor of the buck converter. Method 1100 is performed in a system, such as system 100 of FIG. 1, which includes a feedback loop and a synchronous buck converter held at a nearly constant voltage. The buck converter is controlled by a PWM signal, where adjustments in the duty cycle of the PWM signal cause the buck converter to either lower or raise the output voltage.

At action 1110, the buck converter receives PWM signals at its input switches. An example is shown in the timing diagram of FIG. 3 where voltages 301 and 302 are PWM signals that affect the output voltage of the buck converter. Examples of input switches include the transistors identified as switches 112-115 in FIG. 2.

At action 1120, the input switches and a flying capacitor of the buck converter produce a three-level voltage at an input node of the inductor of the converter. An example of the three-level voltage at the input node includes voltage VX of FIGS. 2 and 3. The voltage VX shown in FIG. 3 varies between VDD/2 and VDD, but a reduction in the duty cycle of the PWM signals may cause the voltage VX to vary between zero and VDD over two. As shown in FIG. 3, voltage VX has a frequency twice that of the signals 301 and 302.

At action 1130, capacitance is applied at the input node of the inductor to reduce ripple of the three-level voltage. An example is capacitor CX in FIG. 2. In some embodiments, capacitor CX may be accompanied by a switch so that it can be added to or removed from the circuit. Action 1130 may include in some embodiments turning the switch on to include capacitor CX when the load is relatively heavy and turning the switch off to remove capacitor CX when the load is relatively light. Logic to switch on and switch off capacitor CX may be included in any appropriate part of the circuit, including in the PWM controller or other circuit.

At action 1140, the buck converter converts the input voltage to the output voltage. An example output voltage is shown as Vout in FIG. 3.

The scope of embodiments is not limited to the specific method shown in FIG. 11. Other embodiments may add, omit, rearrange, or modify one or more actions. For instance, action 1140 is performed continually as actions 1110-1130 are also performed. Also, method 1100 may be part of a larger feedback operation that holds the output voltage of the buck converter at the nearly constant value (the larger feedback operation is described in more detail above with respect to FIG. 1).

Various embodiments may include advantages. For instance, by adding a charge sharing cap CX and switch SCX the $3^{rd}$ level voltage (across Cfly) VDD/2 is more stable across power, voltage, and temperature (PVT). Without the CX, the $3^{rd}$ level voltage may not be as stable at VDD/2 over PVT unless a complicated VDD/2 regulator (not shown) is used. Such increased stability may result in less ripple at the voltage VX.

Figure 12:
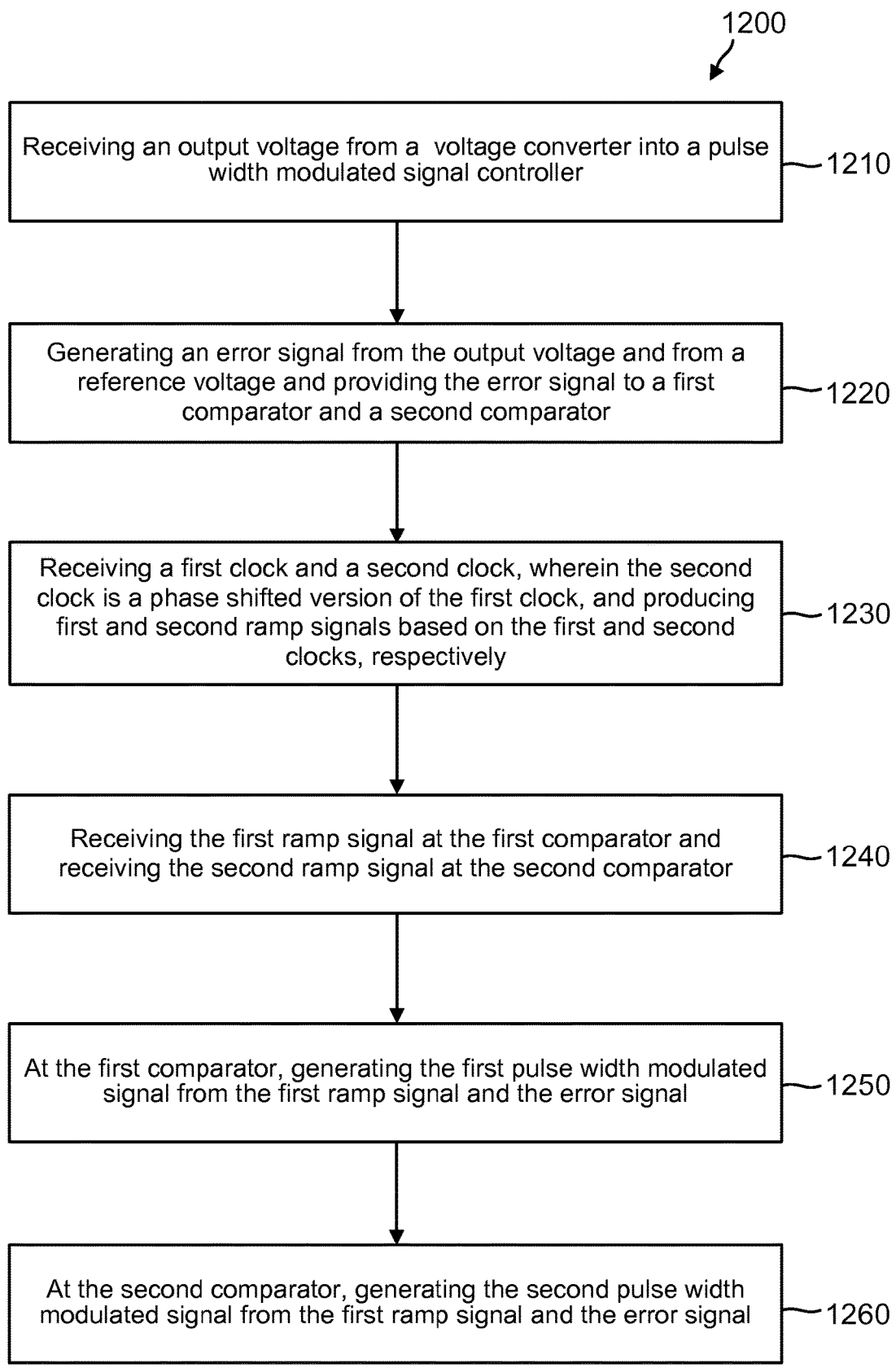
FIG. 12 illustrates a flowchart of an example method for use in the system of FIG. 5, according to one embodiment.

A flow diagram of an example method 1200 of operating a three-level buck converter is illustrated in FIG. 12. In one example, method 1200 is performed by a pulse width modulation signal controller, such as PWM controller 102 shown in FIGS. 1 and 5 and PWM controllers 810 and 815 in FIG. 8. In the example of FIG. 8, each of controllers 810 and 815 would perform method 1200 independently, but using different clocks, in some embodiments.

At action 1210, the PWM controller receives an output voltage from a voltage converter. An example is shown in FIG. 5, where Vout is received back into controller 102. The output voltage is provided as part of a feedback loop, where the system maintains the output voltage at a desired level.

At action 1220, the PWM controller generates an error signal from the output voltage and from a reference voltage. An example is illustrated with respect to FIG. 5, where Vout and the reference voltage (Ref) are received into an amplifier arranged in a feedback configuration to filter the error signal. It is within the scope of embodiments to generate an error signal using any appropriate technique.

Further at action 1220, the error signal is provided to a first comparator and a second comparator. An example is shown at FIG. 5, where comparators 513 and 514 receive the error signal and the respective ramp signals.

At action 1230, the PWM controller receives a first clock and a second clock. The second clock is a phase-shifted version of the first clock, such as described above with respect to FIGS. 5 and 6. One example of a phase-shifted clock is an inverted clock, so that one embodiment includes a clock and inverted clock received by the PWM controller.

Figure 13:
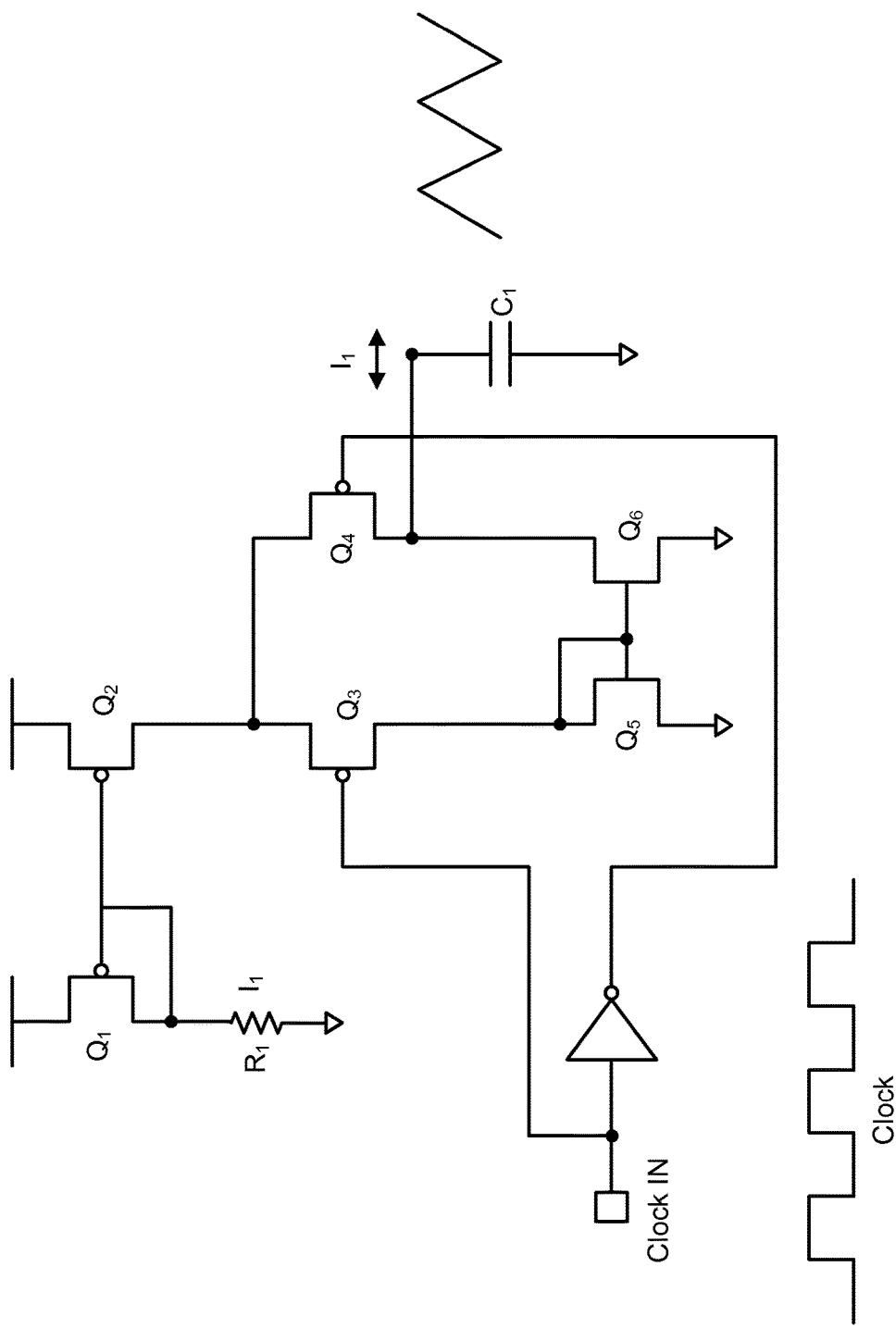
FIGS. 13-15 illustrate example circuits for producing ramp signals from clock signals, according to several embodiments.

In some embodiments, the PWM controller generates the clocks as well, so that action 1230 further includes generating the first and second clock. Action 1230 also includes producing first and second ramp signals based on the first and second clocks, respectively. Any appropriate technique to produce the ramp signals from clocks may be used in various embodiments. For example, FIG. 13 is an illustration of an example ramp generating circuit 1300, according to one embodiment. The clock is received at the node clock in, and transistors Q1 and Q2 form a current mirror for charging capacitor C1. Transistors Q3 and Q4 are differential pair, which steer the current either directly into capacitor C1 or through the mirror formed by transistors Q5 or Q6, which is the discharge path. Example current I1 is a sawtooth waveform that can be used as one of the ramp signals of FIG. 5. It is understood, that a similar circuit could also be used to receive the phase-shifted clock and to produce a corresponding ramp signal. Ramp generating circuit 1300 may be especially applicable to some embodiments because of its speed of operation and simplicity, though other embodiments may use different rent generating circuits, such as those shown in FIG. 14 and FIG. 15.

Figure 14:
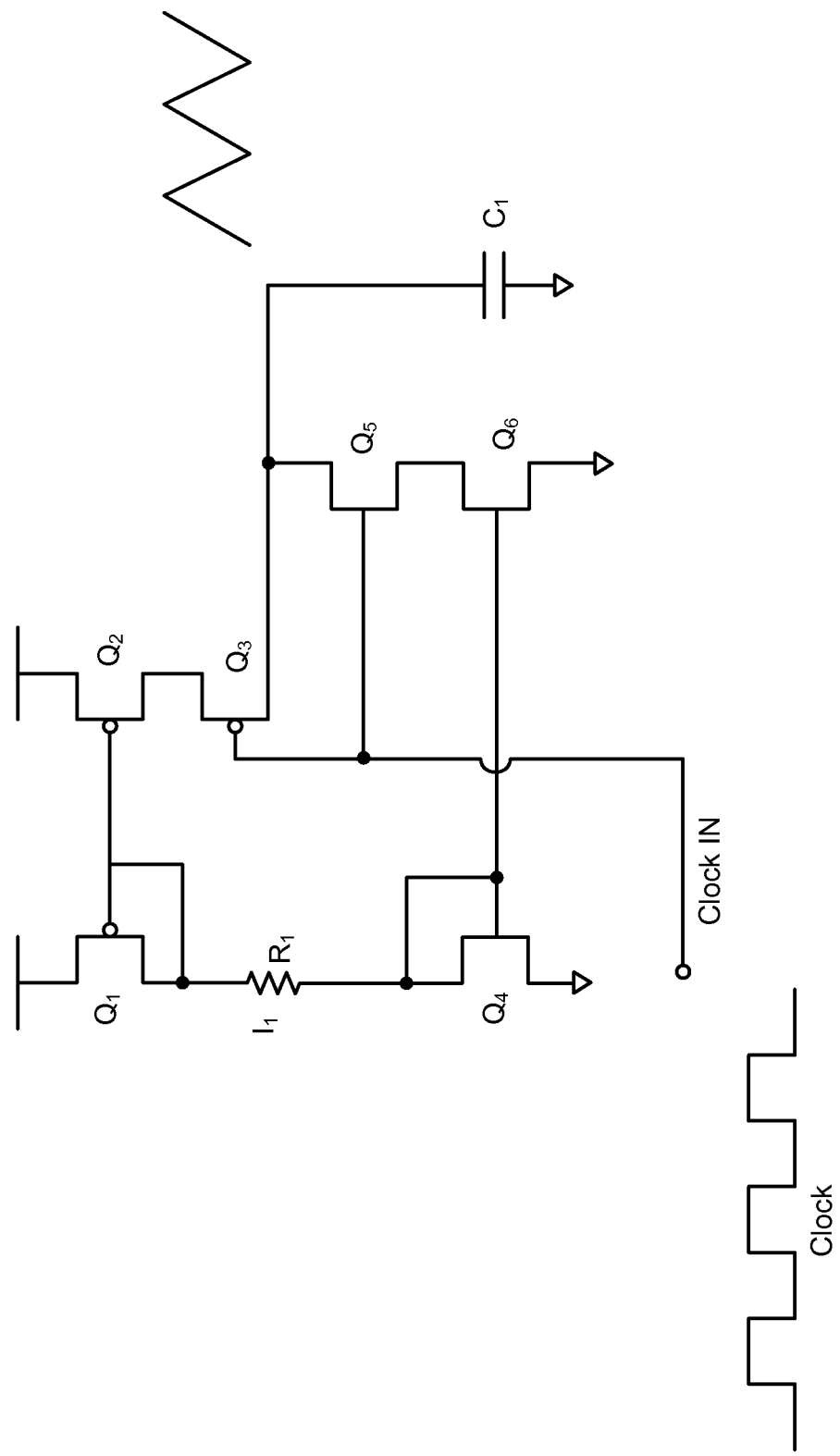

Another example of a circuit to produce a ramp signal is provided in FIG. 14, showing ramp generating circuit 1400, according to one embodiment. Transistors Q1 and Q2 form a current mirror. Similarly, transistors Q4 and Q6 form another current mirror. The transistors act to charge and discharge capacitor C1, which produces a sawtooth waveform that can be used as one of the ramp signals of FIG. 5. Once again, a similar circuit can also be used to receive the phase-shifted clock and to produce a corresponding ramp signal.

Figure 15:
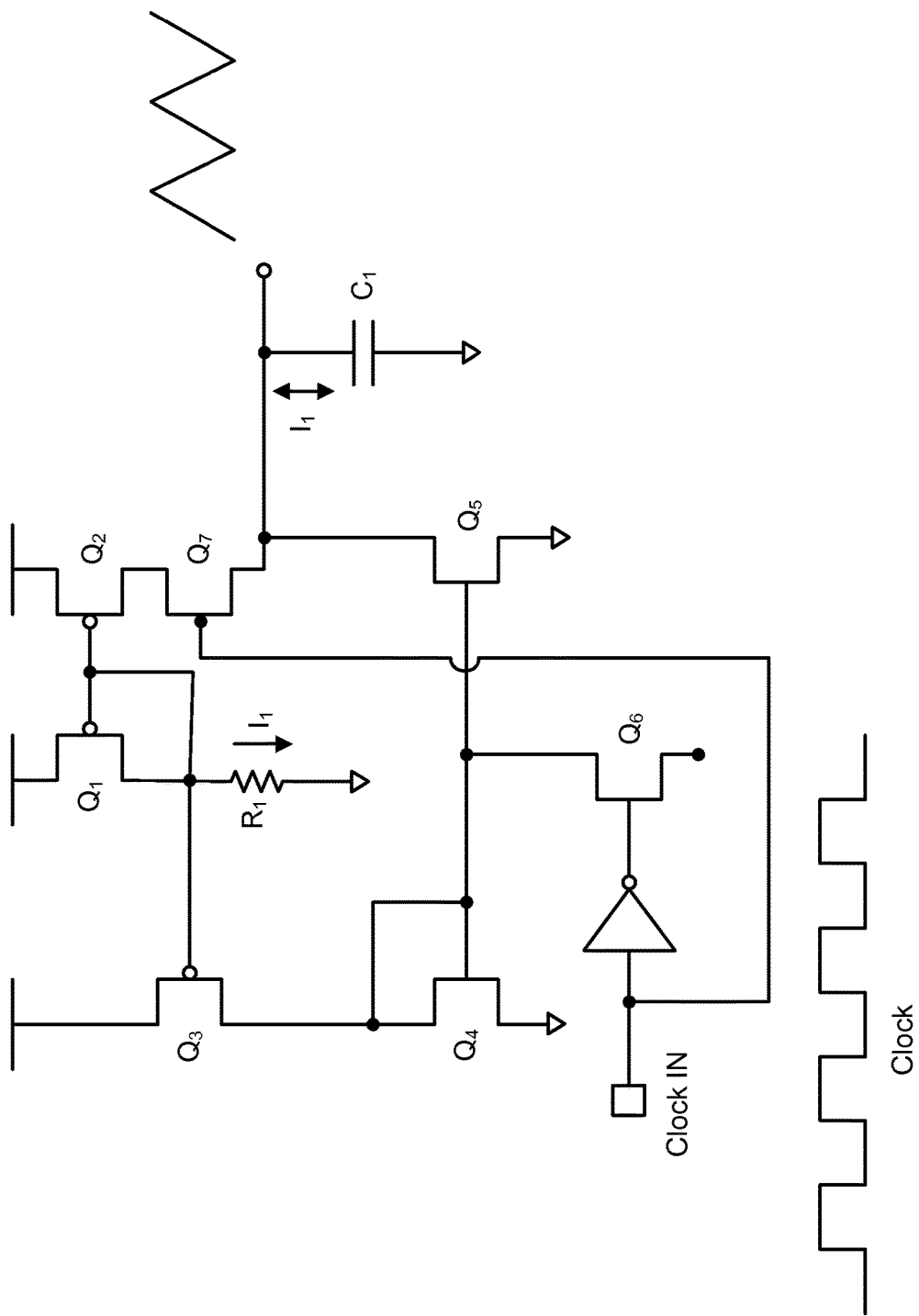

Yet another example of a circuit to produce a ramp signal is provided in FIG. 15, showing ramp generating circuit 1500, according to another embodiment. In ramp generating circuit 1400, each of the transistors are the same size or substantially the same size so that charging and discharging current are equal. Transistors Q1 and Q2 form the charging current to the capacitor C1. Whenever the clock period is high, transistor Q7 is off, which stops the current from charging C1. At the same time, transistor Q6 is also off, which is the shunt control for the discharge current I1. The current I1 is charged and discharged by capacitor C1, thereby producing a sawtooth waveform that can be used as a ramp signal in FIG. 5. A similar circuit can be used to receive the phase-shifted clock to produce the other ramp signal. Each of the circuits of FIGS. 13-15 receives the clock signal to a set of transistors, thereby charging and discharging a capacitor to produce the ramp signal. Of course, other appropriate techniques may be used to produce the ramp signals from the clock signals.

Returning to FIG. 5, it is noted that the ramp signals (Ramp 1 and Ramp 2) have both up and down portions of the ramp, thereby conforming to a triangle waveform shape. This is in contrast to some conventional PWM controllers that use either a rising edge ramp or a falling edge ramp, which conforms to a sawtooth waveform. By using an up and down ramp waveform, various embodiments described herein may have twice the gain (as experienced at Vout) as compared to embodiments using only a falling edge ramp or a rising edge ramp with the same frequency. One advantage that some embodiments may enjoy is that the middle point of an up and down ramp may be identified more easily, and may therefore allow for less complicated current measuring.

At action 1240, the first comparator receives the first ramp signal, and the second comparator receives the second ramp signal. The comparators also receive the error signal, as noted above with respect to action 1220.

At actions 1250 and 1260, the comparators generate the respective PWM signals from the ramp signals and the error signals. Specifically, the first comparator receives the error signal and the first ramp signal and produces the first PWM signal in response thereto. Similarly, the second comparator receives the error signal and the second ramp signal and produces the second PWM signal in response thereto.

An example is illustrated at FIG. 6, where a comparator receives both a ramp signal and the error signal and generates a pulse width modulation signal having a duty cycle based on relative voltage levels of the error signal and ramp signal. Of course, the scope of embodiments is not limited to the specific example shown in FIG. 6, as any appropriate technique to produce PWM signals from ramp signals may be used.

The scope of embodiments is not limited to the specific method shown in FIG. 12. Other embodiments may add, omit, rearrange, or modify one or more actions. For instance, actions 1210-1260 may be performed continuously over thousands, or millions, or billions of clock cycles. Also, other embodiments may include multiple sections, such as that shown in FIG. 8 having two buck converters and two PWM controllers. In such embodiments, one PWM controller performs actions 1210-1260, while the other PWM controller also performs actions 1210-1260, although the clock pulses maybe phase-shifted from section-to-section as explained above with respect to FIG. 9.

In yet another example, some method embodiments may include operating the three-level buck converter 110 of FIG. 2 as a two-level buck converter. In such an embodiment, the method includes tying the gates of switches 112 and 113 together and tying the gates of switches 114 and 115 together. The switches 112 and 113 are then driven using a single PWM signal, and switches 114 and 115 are maintained closed. Such method embodiment may include gating either the clock or the phase-shifted clock so that only one clock is used to generate only one ramp signal. Operating the circuit of FIG. 2 as a two-level buck converter may be appropriate in instances when the current through Rload is relatively small. Therefore, some embodiments may drive the buck converter 110 of FIG. 2 as a three-level buck converter when current demand is relatively high, and may change modes to drive the buck converter 110 as a two-level buck converter when current demand is relatively low.

The techniques and circuits described above for producing the PWM signals are not limited to the specific circuits and techniques of FIG. 2. Thus, while the three-level buck converter of FIG. 2 has a switched capacitor CX to reduce ripple at the input to the inductor L, other embodiments may be used with conventional three-level buck converters that do not include the switched capacitor. For instance, the PWM controller of FIG. 5 may be used with other three-level buck converter architectures, now known or later developed.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
   a control system for a three-level buck converter, the three-level buck converter including multiple input switches, each of the input switches receiving one of a plurality of different pulse width modulated signals, the control system including:
      a first clock signal and a second clock signal, the second clock signal being a phase-shifted version of the first clock signal;
      ramp generating circuitry receiving the first and second clock signals and producing first and second ramp signals, respectively, from the first and second clock signals;
      a first comparing circuit receiving the first ramp signal and producing a first one of the pulse width modulated signals therefrom; and
      a second comparing circuit receiving the second ramp signal and producing a second one of the pulse width modulated signals therefrom;
   the circuit further comprising an additional control system for an additional three-level buck converter, wherein the additional control system is configured to receive a third clock signal and a fourth clock signal, further wherein the fourth clock signal is a phase-shifted version of the third clock signal, and wherein the first and second clock signals are phase-shifted relative to the third and fourth clock signals by 90°.

2. The circuit of claim 1, further comprising:
   an error circuit configured to produce an error signal from the output voltage of the three-level buck converter and a reference voltage.

3. The circuit of claim 1, wherein the buck converter comprises four input switches, wherein a first subset of two of the input switches is configured to receive the first one of the pulse width modulated signals, and a second subset of two of the input switches is configured to receive the second one of the pulse width modulated signals.

4. The circuit of claim 3, wherein the second clock signal is phase-shifted by 180° relative to the first clock signal.

5. The circuit of claim 1, wherein the first and second ramp signals both include up ramp portions and down ramp portions.

6. The circuit of claim 1, further comprising:
error circuitry configured to produce an error signal based on an output voltage of the three-level buck converter and a reference voltage, wherein the first comparing circuit is configured to generate the first one of the pulse width modulated signals from the error signal and the first ramp signal.

7. The circuit of claim 1, further including circuitry having an inverter configured to receive the first clock and configured to generate the second clock.

8. The circuit of claim 1, wherein the control system comprises a pulse width modulation controller configured to receive an output voltage of the three-level buck converter and configured to vary a duty cycle of the first and second pulse width modulated signals in response to receiving the output voltage.

9. The circuit of claim 8, further comprising:
a compensation network within a feedback path of the output voltage, the compensation network configured to compensate at least a pole or a zero of the three-level buck converter to result in a first-order control system.

10. A method for controlling a three-level buck converter, the method comprising:
receiving a first clock and a second clock, wherein the second clock is a phase-shifted version of the first clock;
producing first and second ramp signals based on the first and second clocks, respectively;
receiving the first ramp signal at the first comparator and receiving the second ramp signal at the second comparator;
at the first comparator, generating a first pulse width modulated signal from the first ramp signal;
at the second comparator, generating a second pulse width modulated signal from the second ramp signal; and
outputting the first pulse width modulated signal to a first subset of input switches of the three-level buck converter and outputting the second pulse width modulated signal to a second subset of input switches of the three-level buck converter; and
producing a third pulse width modulated signal and a fourth pulse width modulated signal to control an additional three-level buck converter, wherein the third and fourth pulse width modulated signals are phase-shifted relative to the first and second pulse width modulated signals by 90°.

11. The method of claim 10, further comprising:
receiving an output voltage from the three-level buck converter into a pulse width modulated signal controller, the three-level buck converter being controlled by the first pulse width modulated signal and the second pulse width modulated signal that are produced by the pulse width modulated signal controller;
generating an error signal from the output voltage and from a reference voltage and providing an error signal to the first comparator and the second comparator; and
wherein generating the first pulse width modulated signal includes comparing the error signal to the first ramp signal, and wherein generating the second pulse width modulated signal includes comparing the error signal to the second ramp signal.

12. The method of claim 10, further comprising:
generating the second clock by inverting the first clock.

13. The method of claim 10, wherein the three-level buck converter includes four input transistors, the method further including:
receiving a first one of the pulse width modulated control signals by a first subset of two input transistors;
receiving a second one of the pulse width modulated control signals by a second subset of two input transistors, wherein the first and second pulse width modulated control signals are phase-shifted relative to each other by 180°.

14. The method of claim 10, wherein the first and second ramp signals comprise up and down ramp signals.

15. A voltage regulating circuit comprising:
a three-level buck converter having four input switches, a first subset of the four input switches configured to receive a first pulse width modulated signal, a second subset of the four input switches configured to receive a second pulse width modulated signal;
a pulse width modulated signal controller in communication with the three-level buck converter and configured to provide the first and second pulse width modulated signals, the pulse width modulated signal controller comprising:
an error circuit configured to receive an output voltage of the three-level buck converter and a reference signal and configured to output an error signal;
a ramp generating circuit configured to receive a first clock and a second clock, the second clock being a phase-shifted version of the first clock, the ramp generating circuit configured to generate a first and a second ramp signal from the first and second clock, respectively;
a first comparator configured to receive the error signal and the first ramp signal and to output the first pulse width modulated signal in response thereto; and
a second comparator configured to receive the error signal and the second ramp signal and to output the second pulse width modulated signal in response thereto;
the voltage regulating circuit further comprising an additional pulse width modulated signal controller configured to control an additional three-level buck converter, wherein the additional pulse width modulated signal controller is configured to generate a third and a fourth clock for the another three-level buck converter, further wherein the third and fourth clocks are phase-shifted 90° with respect to the first and second clocks.

16. The voltage regulating circuit of claim 15, wherein the voltage regulating circuit is part of a system-on-a-chip and is configured to power a processing core.

17. The voltage regulating circuit of claim 15, wherein the second clock signal is phase-shifted by 180° relative to the first clock signal.

18. The voltage regulating circuit of claim 15, wherein the first and second ramp signals both include up ramp portions and down ramp portions.

19. The voltage regulating circuit of claim 15, further including inverter circuitry configured to generate the second clock from the first clock.

20. A circuit comprising:
a three-level buck converter; and a pulse width modulated signal controller configured to control the three-level buck converter, the pulse width modulated signal controller including:
  means for producing a first ramp signal from a first clock signal and a second ramp signal from a second clock signal, wherein the second clock signal is a phase-shifted version of the first clock signal;
  means for generating the first pulse width modulated signal from the first ramp signal; and
  means for generating the second pulse width modulated signal from the second ramp signal;
  wherein the means for generating the first pulse width modulated signal and the means for generating the second pulse width modulating signal are configured to generate the first and second pulse width modulated signals in response to a level of a voltage output of the three-level buck converter;
the circuit further comprising an additional pulse width modulated signal controller for an additional three-level buck converter, wherein the additional pulse width modulated signal controller is configured to receive a third clock signal and a fourth clock signal, further wherein the fourth clock signal is a phase-shifted version of the third clock signal, and wherein the first and second clock signals are phase-shifted relative to the third and fourth clock signals by 90°.

21. The circuit claim 20, where the pulse width modulated signal controller further comprises:
  means for generating an error signal from the voltage output of the three-level buck converter and a reference voltage;
  wherein the means for generating the first pulse width modulated signal and the means for generating the second pulse width modulated signal are configured to generate the first and second pulse width modulated signals, respectively, in response to the error signal.

22. The circuit of claim 20, wherein the buck converter comprises four input switches, wherein a first subset of two of the input switches is configured to receive the first one of the pulse width modulated signals, and a second subset of two of the input switches is configured to receive the second one of the pulse width modulated signals.

23. The pulse width modulated signal controller of claim 20, wherein the second clock signal is phase-shifted by 180° relative to the first clock signal.

24. The pulse width modulated signal controller of claim 20, wherein the first and second ramp signals both include up ramp portions and down ramp portions.

25. The pulse width modulated signal controller of claim 20, further including means to invert the first clock to generate the second clock.

26. The pulse width modulated signal controller of claim 20, wherein the three-level buck converter is part of a system on a chip and is configured to power a processing core.

* * * * *